Dec. 22, 1953 M. J. SCHMITZ ET AL 2,663,763
TIME-LIMITING CIRCUIT ARRANGEMENT
Filed Dec. 6, 1949
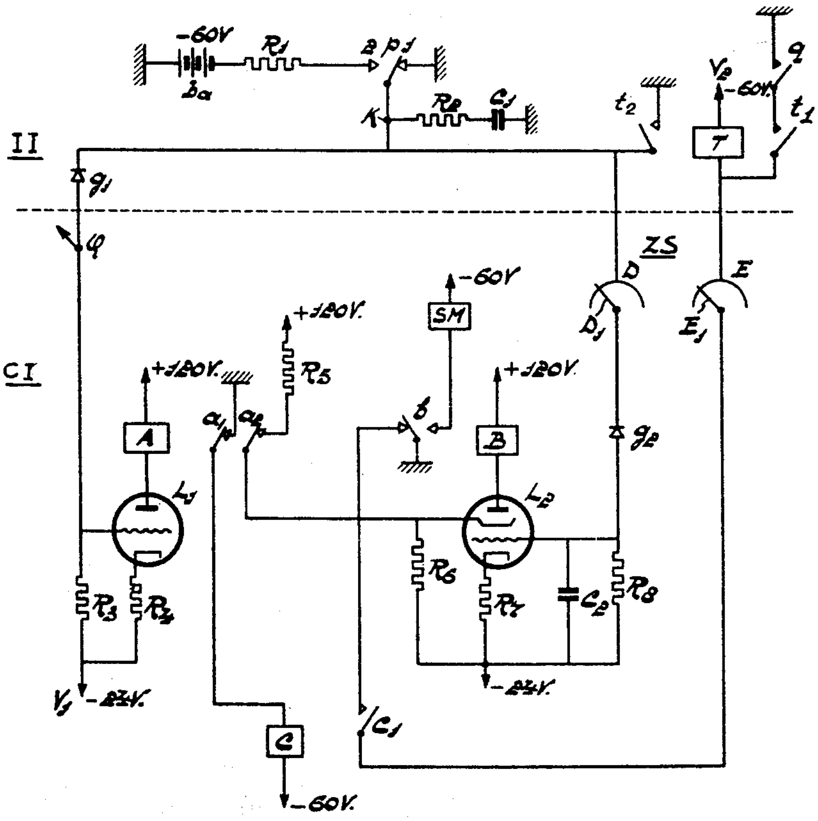
INVENTORS
Mattheus Jacobus Schmitz
and Robert Berthold Buchner
BY [signature]
AGENT Patented Dec. 22, 1953

2,663,763

UNITED STATES PATENT OFFICE 2,663,763

TIME-LIMITING CIRCUIT ARRANGEMENT

Mattheus Jacobus Schmitz and Robert Bertold Buchner, Hilversum, Netherlands, assignors to Hartford National Bank and Trust Company, Hartford, Conn., as trustee Application December 6, 1949, Serial No. 131,439

2 Claims. (Cl. 179—27)

The invention relates to supervisory circuit-arrangements with the use of which a tertiary switching operation is performed or initiated if a primary switching operation is not followed within a predetermined time interval by a secondary switching operation.

Such circuit-arrangements are used inter alia in automatic signalling systems so as to prevent common switching equipment being engaged for an unnecessarily long time. Accordingly, they are referred to as "time limiting circuit arrangements."

As a rule, registers and/or cord circuits in automatic telephone exchanges comprise one or more time-limiting circuits.

A primary switching operation may consist, for example, in a register or a cord circuit being engaged by a calling subscriber. If the subscriber omits to dial (secondary switching operation) within a definite time (for example 30 seconds) after he has received dialling tone, a time-limting circuit becomes operative, the tertiary switching operation being thus initiated. The tertiary switching operation may consist, for example, in automatic through-connection of the subscriber to an operator, giving an alarm signal, identification of the subscriber and/or release of the register or the cord circuit.

In certain systems, a time-limiting circuit is used to interrupt the dialling path, if a call is not answered within a given time.

Known time-limiting circuits comprising a thermal relay do not yield satisfactory results in practice, because the switching periods may vary widely owing to the fact that the temperature of the relay does not immediately reassume its normal value upon disconnection of the circuit.

With other known time-limiting circuits a central time piece periodically, for example every 5 seconds, transmits pulses to time-limiting circuits which count the pulses received upon the occurrence of a primary switching operation and initiate the tertiary switching operation, when the number exceeds a definite limit value. In these arrangements the time-limiting circuits must comprise a pulse counting device for registering the pulses.

It has been suggested to use a time-limiting circuit in which a primary switching operation switches on a charging circuit of a condenser and the condenser is discharged upon the occurrence of a secondary switching operation. However, if the secondary switching operation does not occur within a given time, the condenser becomes charged such that a gas discharge tube coupled to the condenser ignites, causing a relay included in the output circuit of the tube to energize and perform the tertiary switching operation.

It has been found in practice that the time limit is exceeded in a few cases only, so that it is rarely necessary for the discharge tubes to become operative.

The invention is based on recognition of the fact that a more economic use is made of the discharge tubes, if instead of associating a discharge tube with each condenser use is made of a common supervisory circuit which with the use of electronic means supervises the condenser voltages of a number of time-limiting circuits.

Such a common supervisory circuit is capable of controlling a large group of time-limiting circuits, so that considerable economy as compared with the known arrangements is ensured.

According to the invention a supervisory circuit-arrangement with the use of which a tertiary switching operation is performed or initiated, if a primary switching operation is not followed within a predetermined time interval by a secondary switching operation, the primary switching operation switching a charging circuit of a condenser, and the normal condition of the condenser being re-established on the occurrence of a secondary switching operation, provision being made of electronic means which respond when the voltage across the condenser passes a definite limit value, is characterized in that points of the condenser charging circuits of several time-limiting circuits to be supervised are connected to test contacts of a finder switch associated with a common supervisory circuit and are each coupled through a rectifier to a control-electrode of a first discharge tube of the common supervisory circuit, the rectifiers being normally cut off and a rectifier becoming conductive, if the voltage across the associated condenser passes the limit value, in which case the first discharge tube response, and by means associated therewith the finder switch is actuated, a second discharge tube, a control-electrode of which is coupled to a first wiper of the finder switch, responding upon a test contact being reached, the potential of which has passed the threshold value and the movement of the finder switch being stopped, whilst at the same time by way of a further wiper of the finder switch a relay of the time-limiting circuit concerned is energized with the result that the tertiary siwtching operation is initiated.

In order that the invention may be more clearly understood and readily carried into effect, it will now be described more fully with reference to the accompanying diagrammatic drawing, which shows one embodiment of the circuit-arrangement according thereto only those elements being shown which are required for understanding the invention.

The circuit-arrangement shown in the drawing comprises a common supervisory circuit CI and one of a number of the time-limiting circuits II to be checked, for example a register.

In the normal position, the contact arm *p* of a relay (not shown) of the register occupies position I, point K is at earth potential and condenser C1 is uncharged. The operation of the arrangement is unchanged, if as an alternative, the right-hand terminal of the condenser C1 instead of being connected to earth is connected to a point of fixed potential, i. e. if the condenser were normally charged.

The point K is connected to the test contact D of a finder switch ZS and, by way of a rectifier *g1*, to a checking point Q of the device CI. The point Q has normally a potential of —24 v. and the rectifier *g1* is cut off. Point Q is coupled in a similar manner through rectifiers to the points K of further time-limiting circuits.

On the register being engaged the contact arm *p* is moved into position 2, and at the same time contact *q* is closed. The condenser C1 is slowly charged negatively through a high resistance R1 and a resistance R2 with the use of a battery *ba*. The resistance R2 tends to prevent contacts *p1* or *t2* from burning during discharge of the condenser C1. The resistance value of R2 may, consequently, be comparatively low.

The time-constant of the condenser charging circuit is chosen such that, at the end of the desired period for example 30 seconds, point K has assumed a potential of —24 v. If it is necessary to construct long period time-limiting circuits several condenser charging circuits may advantageously be connected in cascade, so that a condenser of the following charging circuit is charged by way of the preceding charging circuit.

If the subscriber dials within the given time, the arm *p* returns to normal position 1 and condenser C1 discharges by way of resistance R2.

However, if no dialling takes place during the given time, for example, because the register is engaged due to the fact that a subscriber's receiver is not replaced correctly on its rest, the potential of point K drops below —24 v. and rectifier *g1* becomes conductive so that the potential of point Q is likewise decreased. The charging condition of the preceding charging circuits is not affected thereby, since the associated rectifiers are cut off.

Point Q is connected to the control-grid of a discharge tube L1. The tube L1, the emission current of which is limited to a suitable strength with the use of a resistance R4 included in the cathode lead, is normally conducting and the relay A included in the anode circuit is normally energized.

If the potential of point Q drops below —24 v., the tube L1 is cut off and relay A is de-energized. Rest contact *a2* completes, through resistance R5, a supply circuit for the screen-grid of a second discharge tube L2, which thus becomes conducting, so that relay B in the anode circuit of the tube L2 is energized. In the normal position, the potential of the screen-grid of L2 is equal to that of the cathode and the tube L2 is cut off.

By moving break and make contact *b* into the make-position, the rotary magnet SM of the finder switch ZS is magnetized and the switch ZS is actuated.

Rest contact *a1* completes an energizing circuit for relay C. Make-contact *c1* is not permitted to be established until after contact *p* has moved from its break position, since otherwise an undesired circuit would be completed.

During the movement of the switch, the common supervisory circuit CI tests, by way of the test wiper D1, the potentials of points K of the various charging circuits. For this purpose the control-grid of tube L2 is coupled to the wiper D1. In order to prevent the charging condition of the condenser charging circuits from being disturbed, the control-grid and the wiper have included between them a rectifier *g2*, which becomes conductive only when the potential of a marking contact reached is lower than —24 v. As soon as the outlet of ZS is reached, which corresponds to the condenser charging circuit II the time-limit of which is exceeded, *g2* becomes conducting, so that the potential of control-grid of tube L2 decreases, tube L2 is cut off, and relay B is de-energized.

The energizing circuit of rotary magnet SM is interrupted and the switch ZS stops at the outlet concerned.

Now a circuit is completed from earth through rest contact *b*, make contact *c1*, wiper E1, bank contact E, winding of relay T of device II to supply point V2 having a potential of —60 v. Relay T is energized and completes a holding circuit for itself through make contact *t1* in series with make contact *q* to earth.

Condenser C1 becomes discharged through resistance R2 and make contact *t2*. Point K assumes earth potential and tube L1 becomes again conductive. The contacts *a1* and *a2* open, so that relay C is deenergized and contact C1 opens. The common supervisory circuit CI has thus returned to its normal position.

Relay T, however, remains held through make contact *t1*. By the opening or closing of further contacts (not shown) of relay T, the desired tertiary switching operation is initiated.

What we claim is:

1. Apparatus responsive to first and second switching operations in a condition wherein said first switching operation is succeeded by said second switching operation at an instant beyond a predetermined time interval for initiating a third switching operation, said apparatus comprising a plurality of subordinate circuits, each provided with a chargeable device including a capacitance, means to effect charging and discharging of said capacitance in accordance with said first and second switching operations respectively, whereby the magnitude of charge depends on the interval between said operations, a relay for actuating said third switching operation and a first rectifier; and a common supervisory circuit for said subordinate circuits comprising first and second electron discharge tubes with control electrodes therefor, means to connect the chargeable device through said first rectifier to the control electrode of said first tube and to a first point of constant potential having a value at which said rectifier is rendered conductive only when said capacitance attains a charge corresponding to said predetermined time interval whereby the conductivity of said first tube and the current flow therethrough varies with the conductivity of said first rectifier, means operated by current flow variations in said first tube and connected to said second tube for varying the conductive condition and current flow therethrough accordingly, a rotary switch having first and second rotatable brushes with respective first and second switch banks therefor, each switch bank having a plurality of contacts corresponding to said plurality of subordinate circuits, the contacts of said first bank being respectively connected to said chargeable devices of said subordinate circuits, the contacts of said second bank being respectively coupled through the relays of said subordinate circuits to second points of predetermined potential, electromagnetic means operatively coupled to said switch for rotating said brushes across contacts of respective switch banks, means rendered operative by the current flow of said second tube established when said rectifier is rendered conductive for energizing said electromagnetic means, means connected to said first brush and connected to the control electrode of said second tube for changing the current flow therethrough to de-energize said electromagnetic means to stop said brush rotation when said first brush touches a contact connected to a particular subordinate circuit whose rectifier has been rendered conductive, and means rendered operative by said changed current flow in said second tube to connect said second brush to a point of potential having a value relative to said second point to effect activation of the relay of said particular circuit to initiate the third switching operation.

2. Apparatus, as set forth in claim 1, wherein the means connected to said first brush and connected to said second tube for changing the current flow therethrough includes a second rectifier which is rendered conductive only when said first brush touches the contact coupled to the particular subordinate circuit.

MATTHEUS JACOBUS SCHMITZ.
ROBERT BERTOLD BUCHNER.

References Cited in the file of this patent

UNITED STATES PATENTS

| Number | Name | Date |
|---|---|---|
| 1,871,300 | Burgener | Aug. 9, 1932 |
| 1,941,085 | Hague | Dec. 26, 1933 |
| 2,143,971 | Brazelton | Jan. 17, 1939 |